(12) United States Patent
Banatwala et al.

(10) Patent No.: US 9,015,239 B2
(45) Date of Patent: Apr. 21, 2015

(54) SYSTEM AND METHOD FOR INTEGRATING THIRD PARTY APPLICATIONS INTO A NAMED COLLABORATIVE SPACE

(75) Inventors: Mustansir Banatwala, Hudson, NH (US); Miguel A. Estrada, Hollis, NH (US); Sergei Landar, Cambridge, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1749 days.

(21) Appl. No.: 10/744,143

(22) Filed: Dec. 22, 2003

(65) Prior Publication Data
US 2005/0138118 A1 Jun. 23, 2005

(51) Int. Cl.
*G06F 15/16* (2006.01)
*G06Q 10/00* (2012.01)
*G06Q 10/10* (2012.01)

(52) U.S. Cl.
CPC ...................... *G06Q 10/10* (2013.01)

(58) Field of Classification Search
CPC ..................................................... G06Q 10/10
USPC .................. 709/204, 203, 205; 719/320, 328
See application file for complete search history.

(56) References Cited

U.S. PATENT DOCUMENTS

| | | | | |
|---|---|---|---|---|
| 2002/0069247 | A1* | 6/2002 | Paknad et al. | 709/204 |
| 2004/0107249 | A1* | 6/2004 | Moser et al. | 709/204 |
| 2004/0254945 | A1* | 12/2004 | Schmidt et al. | 707/100 |

OTHER PUBLICATIONS

*Microsoft Computer Dictionary*, Microsoft Press (5th Ed. (2002)), p. 451.*

* cited by examiner

*Primary Examiner* — Saleh Najjar
*Assistant Examiner* — Oleg Korsak
(74) *Attorney, Agent, or Firm* — Steven M. Greenberg, Esq.; CRGO Law

(57) ABSTRACT

A method and system for integrating an instance of a third party application into a collaborative computing environment instance are provided. One or more data interfaces between the third party application instance and the collaborative computing environment are created. The third party application instance is exposed within the collaborative computing environment. A template within the collaborative computing environment that uses the third party application instance is created. A migration tool is used to create collaborative computing environment instances which reference existing instances within the third party application.

20 Claims, 3 Drawing Sheets

SYSTEM AND METHOD FOR INTEGRATING THIRD PARTY APPLICATIONS INTO A NAMED COLLABORATIVE SPACE

BACKGROUND OF THE INVENTION

1. Statement of the Technical Field

The present invention relates to the field of collaborative computing and more particularly to a model that facilitates collaborative computing system development by allowing the integration of third party applications.

2. Description of the Related Art

Collaborative computing provides a means for users to pool their strengths and experiences to achieve a common goal. For example, a common goal may be an educational objective, the completion of a software development project or even creation and use of a system to manage human resources. A collaborative computing environment is defined by (1) a particular context, i.e. the objective of the environment, (2) membership, i.e., the participants in the environment and their roles, and (3) and tools and resources used in the context. Roles are names given to the people in the environment which dictate access to the resources and tools within the environment as well as define the behavior of the community members.

Collaborative computing environments are customized to meet the developers' and users' needs. For example customized collaborative computing environments such as team workspaces, emeetings, virtual classrooms and communities are known. Each of these types of environments is implemented using shared resources as a building block to create the environment. Shared resources for all environments have general characteristics such as a purpose/title, and the premise that they can be created, deleted, cloned, renamed, expired, archived and restored, etc. Shared resources may also be customized to fulfill the objectives of the environment. For example, virtual classrooms employ the general characteristics of the shared resources but further specialize the shared resources in the areas of defining membership roles, e.g., teacher, student, etc., the definition of content, e.g., courses, and provide a shared resource directory customized in the form of a list of courses.

Customized collaborative computing environments must each be developed and configured individually, that is, each instance of a collaborative computing environment can only be of one customized type, e.g., a virtual classroom. As such, present systems require that each separate computing environment be developed from the ground up, even though the environments may have the need for common business processes (tools and resources), e.g., stock quotations, web conferencing interface, news, etc. Put another way, known collaborative computing systems do not provide a way to create an environment in which arbitrary business process objects can be placed and customized to fit the needs of the desired environment. The result is collaborative computing environments which are developed as customized applications and not are readily usable as way to build future environments.

This problem is further exacerbated by the need to integrate collaborative computing environments based on two different products and/or architectures. For example, a company may be implementing a portal J2EE-based (Java 2 Enterprise Edition) collaborative computing product but still have a need access a collaborative computing product based on another technology such as LOTUS DOMINO. It is desirable to have a system and method to integrate the two technologies in a manner which is seamless to the end user and efficient and practical for the system development and deployment team.

A possible solution to the integration problem is to develop software code to migrate data from the data store of one product/technology for user with the other. While this method does create an integrated single user experience and allows use of the features of the product into which the data is migrated, this type of migration software code requires customized software code which necessitates the need for experienced software developers and is therefore costly and time consuming to develop. In addition, feature parity is required between the two technologies/products.

Another possible solution is to provide "on the glass" coexistence by having a portlet in one collaborative computing environment to provide access to the other. For example, a portlet in the J2EE application can be implemented to provide access to the DOMINO based application (the third party application in this case). While this arrangement does not take a lengthy period to develop, it does create (or leave) two environments for the end users; the J2EE-based world and the DOMINO world, for example. In addition, this arrangement does not allow use of the features of the J2EE environment within the third party application portlet.

It is desirable to have a method and system which provides a collaborative computing environment framework that can be specialized into collaborative computing environment applications in a manner which allows integration of third party applications into the environment such that the integration is cost effective, quick to develop and allows the features of the environment to be used with the third party application.

SUMMARY OF THE INVENTION

The present invention addresses the deficiencies of the art in respect to integrating third party applications into a separate collaborative computing environment and provides a novel and non-obvious method, system and apparatus for integrating third party applications into a named collaborative space.

Methods consistent with the present invention provide a method for integrating an instance of a third party on into a collaborative computing environment instance in which one or more data interfaces between the third party application instance and the collaborative computing environment are created. The third party application instance is exposed within the collaborative computing environment. A template is created within the collaborative computing environment that uses the third party application instance, and a migration tool is used to create collaborative computing environment instances which reference existing instances within the third party application.

Systems consistent with the present invention include a system for integrating an instance of a third party application into a collaborative computing environment instance. A first computing device is arranged to execute the instance of the third party application. A second computing device is in operative data communication with the first computing device. The second computing device provides a collaborative computing environment and is arranged to execute the collaborative computing environment instance. The second computing device has a storage device and a central processing unit. The storage device stores at least a part of one or more data interfaces between the third party application instance and the collaborative computing environment, a template within the collaborative computing environment that uses the third party application instance, and a migration tool for creating collaborative computing environment instances which reference existing instances within the third party application. The central processing unit functions to expose the third party application instance within the collaborative computing environment and execute the migration tool to create the collaborative computing environment instance which references the instance within the third party application. The central processing unit is in operative communication with the storage device.

In accordance with another aspect, the present invention provides a computer-readable storage medium storing a computer program which when executed performs a method for integrating an instance of a third party application into a collaborative computing environment instance in which one or more data interfaces between the third party application instance and the collaborative computing environment are created. The third party application instance is exposed within the collaborative computing environment. A template is created within the collaborative computing environment that uses the third party application instance. A migration tool is used to create collaborative computing environment instances which reference existing instances within the third party application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is method and system for integrating a third party application into a named collaborative space (referred to herein as "NCS") instance in a collaborative computing environment. The present invention provides a framework for a collaborative computing environment that can be arranged into collaborative computing environment instances in a manner which allows integration of third party applications into the environment such that the integration is cost effective, quick to develop and allows features of the environment such as access, permissions, etc. to be used with the third party application.

Initially, it is noted that the term templatable as used herein refers to the ability of a collaborative computing community developer or user to create a named collaborative space which can serve as a model for other named spaces. Deploying subsequent named spaces using the method and system of the present invention involves merely calling up an existing template and arranging it to fit the needs of the community. Provisionable as used herein refers to the ability of a collaborative computing community developer or user to base a named collaborative space on a previous named space in a manner which may require little or no customization.

Figure 1:
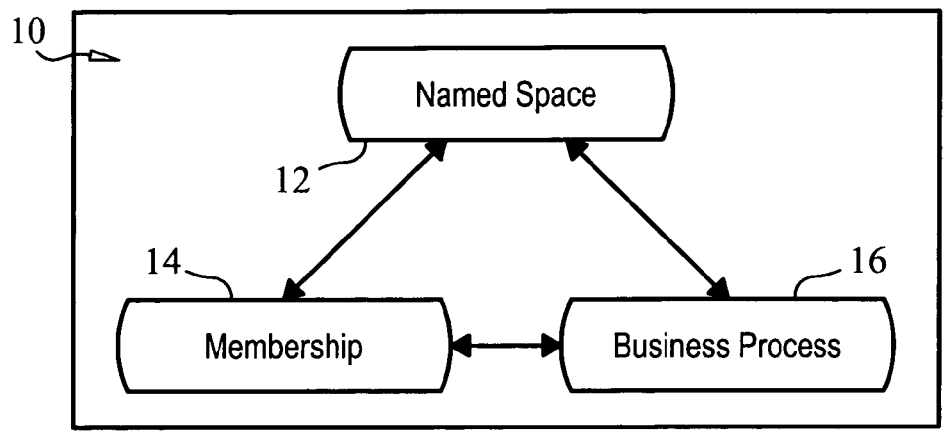
FIG. 1 is a block diagram of a named collaborative space constructed in accordance with the principles of the present invention.

Referring now to the drawing figures in which like reference designators refer to like elements, there is shown in FIG. 1 a block diagram of a named collaborative space constructed in accordance with the principles of the present invention and referred to generally as '10'. Named collaborative space 10 includes named space 12, membership 14 and business process 16, each of which interoperate with each other to provide the framework for NCS 10.

As such NCS 10 defines a secure named instance of a collaborative business process. Named space 12 refers to the community place (also referred to herein as work place) within which the membership and processes exist. In other words, a named space 12 can be a portal place within a collaborative computing environment.

Membership 14 refers to the people within the named collaborative space, i.e. the users of business processes 16 within named space 12. Business process 16 is implemented as one or more business component instances within named space 12. Business component instances provide the tools and resources used by membership 14. Examples of tools provided by business component instances include stock tickers, search engines, discussion forums, document libraries, meeting schedulers, etc.

Business component instances provided as part of business process 16 are managed by a specific NCS 10 instance. Although not required, business component instances can share the same life cycle as its corresponding NCS instance. In other words when an NCS 10 is instantiated, a business component instance is also instantiated. When an NCS instance is removed, the business component instance is also removed. The underlying NCS communicates with business components via a predefined interface. For example, such an interface may be an enterprise java bean ("EJB") or other type of server object that can be called such as remotable application program interfaces.

For example, a business component instance can be represented by a portlet, business logic and the underlying content. As used herein the term "portlet" refers to a java-based web component, managed by a portlet container, that processes requests and generates dynamic content. For example, web portals use portlets as pluggable user interface components that provide a presentation layer to information systems. As discussed below, portlets provide a separate window interface to an application within a larger group of interfaces. In other words, a portlet is used to visualize a business component instance.

Figure 2:
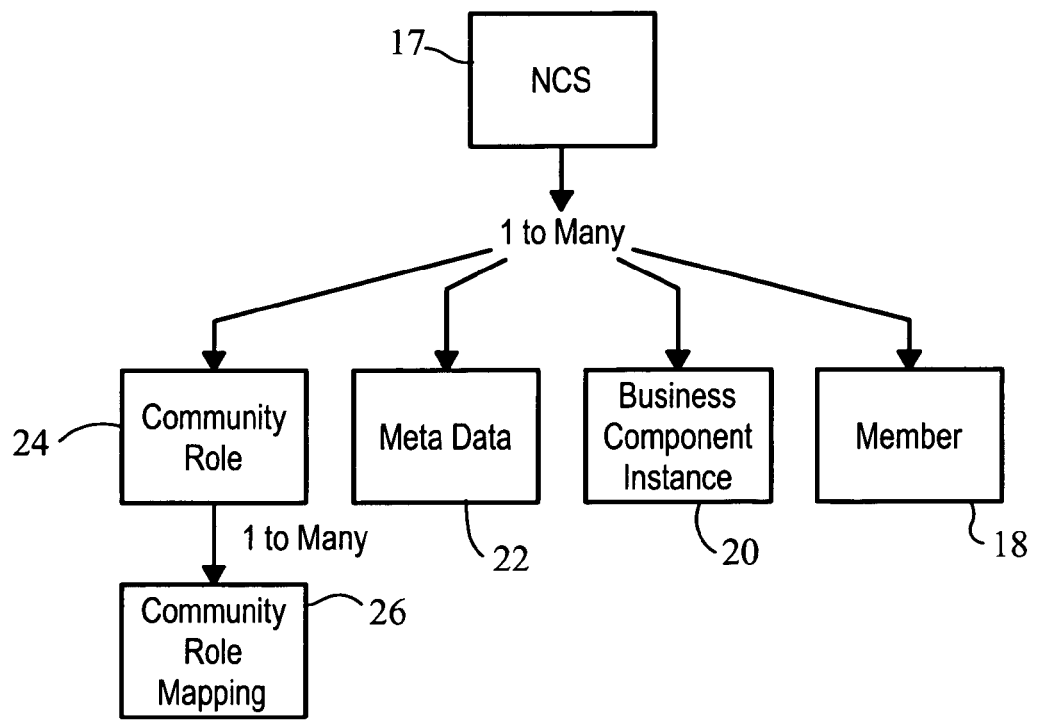
FIG. 2 is a block diagram of a data model showing the relationship between a named collaborative space and other collaborative community components

The relationship between NCS 10 and other objects within a named collaborative space instance is described with respect to FIG. 2. As shown in FIG. 2, NCS object 17 has a 1 to many relationship with member objects 18, business component instances 20, metadata objects 22 and community role objects 24. Community role objects 24 likewise have a 1 to many relationships with community role mapping objects 26. NCS object 17 includes as elements a global unique identifier (GUID), a name, a type, a boolean indicator as to whether the instantiation is a template, a portal place ID identifying the named space 12 for the NCS as well as other information defining size, creation dates, times, modification tracking, etc.

Member object 18 identifies and relates members to a particular named collaborative space 10 as well as a community role. Community roles are discussed below in detail.

Business component instance object 20 includes as elements a GUID, a reference back to the GUID for the NCS instance, the name of the business component, the type of business component, an ID for the business component, a portlet ID, if applicable, as well as an ID indicating which portal page the business component is associated with, i.e. the named space.

Metadata object 22 provides the ability to add and define additional properties of an NCS and includes as elements a name, a reference back to the GUID for the NCS instance, a type, a value integer a value date and a value string. The metadata provides information about the NCS instance such as the moderator, intent of the NCS instance, general information. As such, metadata object 22 type indicates the type of metadata, the value integer, date and string provide the metadata data corresponding to the defined type.

Roles are names given to the members of the named collaborative space which dictate access to the business component instances, i.e. the resources and tools, as well as to define the behavior of membership 14. Community role object 24 represents the valid specific roles set for a particular, i.e. specific, named collaborative space. For example, community roles within a named collaborative space instance relating to a virtual classroom might include teacher and student. Community role mapping object 26 provides a mapping from a specific community role represented by community role objects 24 to business component roles. For example, community role mapping object 26 may map the specific role of teacher within a virtual classroom to that of a moderator having certain access privileges and responsibilities for discussion forums.

Community role objects 24 include as elements a GUID, name, role ID and identification of the corresponding NCS via an NCS GUID. Community role mapping object 26 includes a GUID, name, a community role GUID and other elements which relate the community role mapping object 26 to business components. As such, the data model shown in FIG. 2 provides a framework by which NCS 10 can be presented showing the relationship between NCS object 17 and other objects used to create named collaborative spaces, store them and make them available to users.

Figure 3:
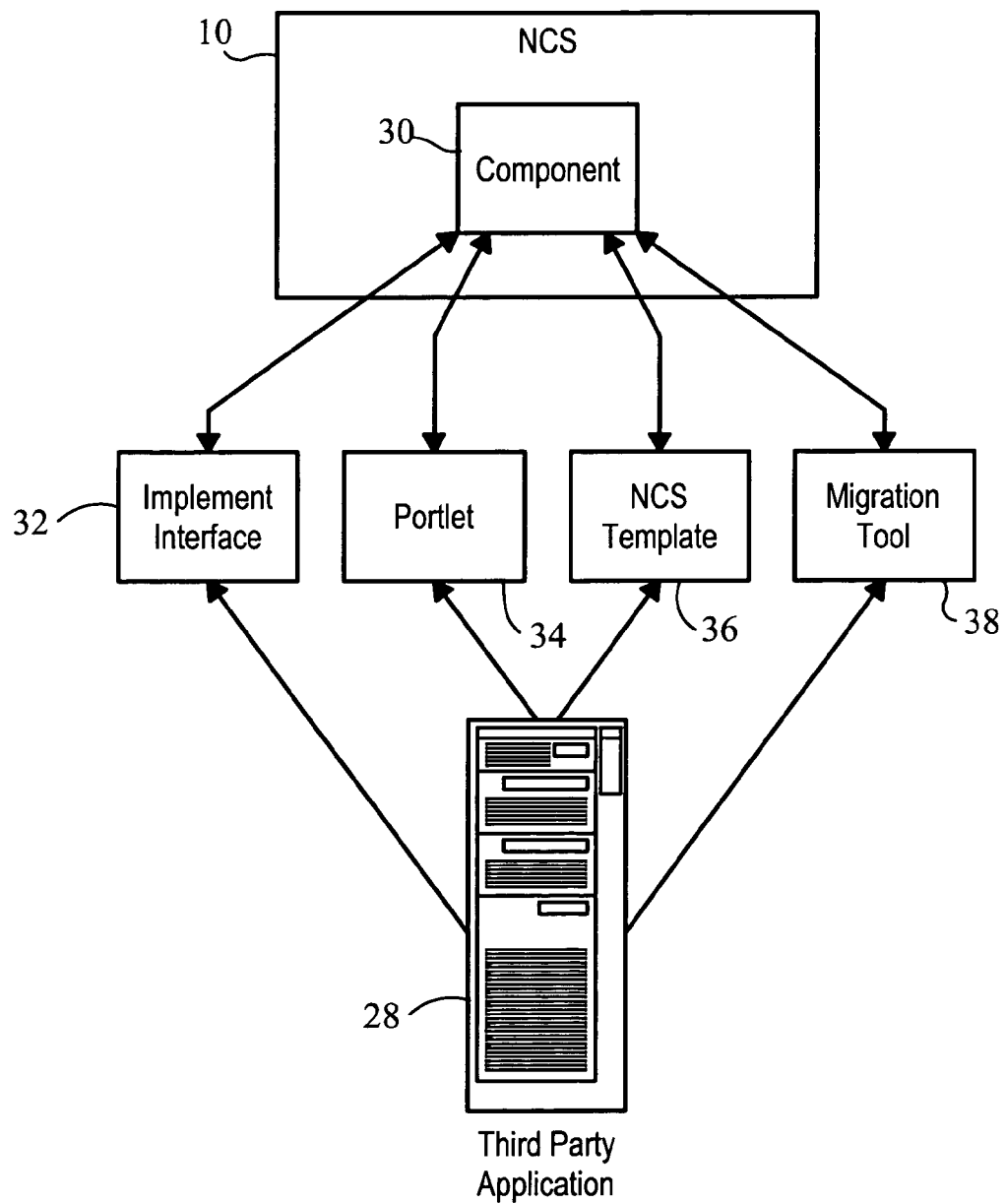
FIG. 3 is a block diagram showing elements for integrating third party applications into a named collaborative space.

The elements for integrating third party applications into a named collaborative space instance are described with reference to FIG. 3. FIG. 3 shows third party application 28, an instance of which is implemented as component 30 within NCS 10. Third party application 28 runs on a computing platform which can be the same as, or different from, the computing platform supporting NCS instance 10. To affect integration between the third party application instance and NCS instance 10, an aspect of the present invention preferably uses four elements.

Data interfaces between third party application 28 and NCS instance 10 are implemented and are shown as implement interfaces element 32. Such interfaces can be implemented in the form of enterprise java beans ("EJB").

This arrangement will allow NCS 10 to communicate with third party application 28 by exposing the life cycle, sensor, transactional, search and membership application program interfaces ("API"). By way of non-limiting example, the life cycle API allows for the creation, removal and updating of instances. The sensor API provides data reporting instances. The transactional API informs the system whether undoing changes is automatic or programmatic, i.e. committing changes as they happen or as a group. The search API provides a mechanism to search for a query passed between instances. The membership API allows for the addition or removal of a member to or from an instance. These APIs provide a mechanism by which third party application 28 communicates with a named collaborative space and vice versa.

Implement interfaces element 32 advantageously provides a way for access, security and other information relating to third party application 28 and its instances to be seamlessly provided to the named collaborative space system so that instances of third party application 28 appear as, and are interacted with, by users just as if the third party application were provided as part of the named collaborative space system.

Instances of third party application 28 must be exposed within an NCS instance 10 as part of component 30. In other words, instances of third party application 28 must physically appear with in an NCS instance 10 so that a user can interact with the third party application instance. By way of example, such exposure can be in the form of a portlet 34. Of note, portlet 34 as well as any other exposure mechanism is not merely a window into the third party application. Rather, portlet 34 is a window into a specific instance of third party application 28. For example, if third party application 28 provided a web conferencing facility, portlet 34 provides a window into a specific web conferencing instance and not necessarily a window into the general web conferencing system. As such, a user logged into NCS instance 10 is provided with a window into instance of third party application 28 and need not log into a separate system.

NCS template is used to create component 30 to provide a space for portlet 34 within NCS instance 10. NCS template 36 points to the interface component, such as the EJB, and the portlet. An example of a named collaborative space instance based on an NCS template which provides for implementation of a third party instance via a third party instance portlet is discussed in detail below with reference to FIGS. 4 and 5.

Migration tool 38 is used to create collaborative computing environment instances which reference existing instances within the third party application. For example, such a tool can be used to create instances that use a particular NCS template 36 to provide portlet 34 for component 30. The migration tool allows for the creation of NCS instances which reference existing instances of the third party application 28. It is presumed that one of ordinary skill in the art could create such a migration tool based on the description provided herein.

By providing the elements shown in FIG. 3, a coexistant catalog of instances for the named collaborative space instances can be created in which at least one named collaborative space instance references the third party application 28. This catalog can be created and maintained in a manner which allows users to create templates in which instances of an NCS and instances within third party application 28 can be mixed and matched to easily create comprehensive collaborative computing environments.

Figure 4:
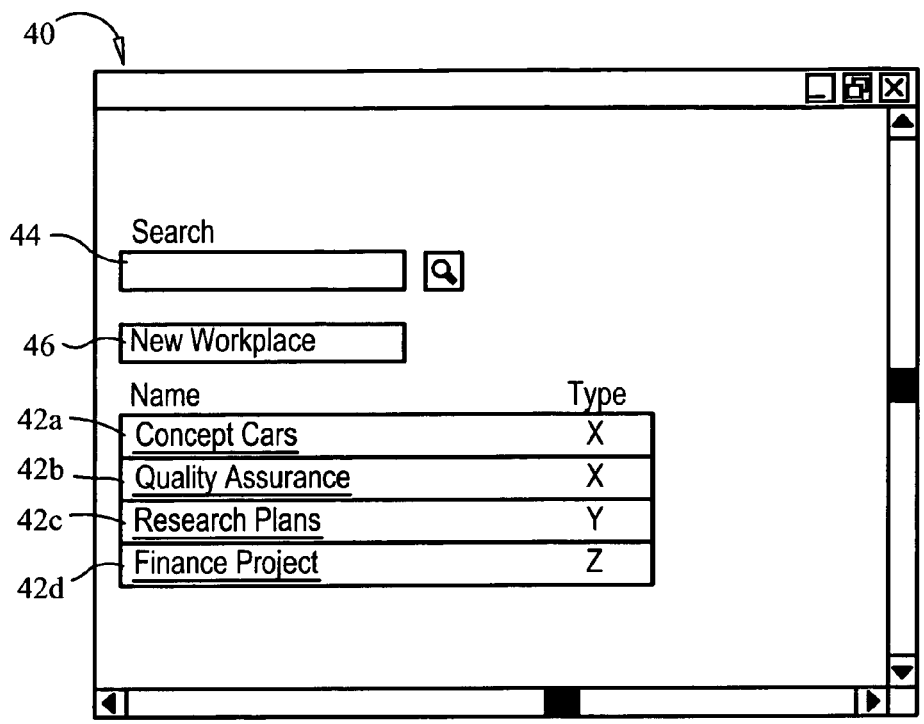
FIG. 4 is an exemplary screen display showing an arrangement of named collaborative space instances.

An example of an implementation of a named collaborative space 10 integrating a third party application such as an IBM DOMINO-based application constructed in accordance with the principles of the present invention is explained with reference to FIGS. 4 and 5. FIG. 4 is an exemplary screen display showing an arrangement of named collaborative space instances. Instance summary screen display 40 includes named collaborative space instances 42a-d (referred to collectively herein as NCS instances 42), search area 44 and new workplace creation button 46 in which one or more of named collaborative space instances 42a-d includes an integrated instance of a third party application. Search area 42 allows a user search for NCS instances. Techniques for implementing computer searches are known in the art and are not described herein.

Each NCS instance 42 represents a specific instantiation of a business process. For example, the finance project NCS instance 42d, if selected by a user via an appropriate graphical user interface (GUI) pointing device or other known method of selection, opens a window such as that shown in FIG. 5 in which the window represents a specific NCS instance. Instance summary screen display 40 also shows the type, i.e. template, of NCS instance associated with each NCS instance 42. For example, the NCS type for finance project instance 42d is Z. In this example, Z is the name of the template used to create the NCS instance 42d. Examples of types of NCS instances provided by IBM include TEAMSPACE and QUICKPLACE. As such, instance summary screen display 40 provides a user with a quick and easy way to determine NCS instances.

Because the present invention provides a provisionable and templatable arrangement for NCS 10, the present invention provides an easy way for users to create a new work place and integrate third party applications without the need to engage application developers and highly trained computer professionals to develop new instances. For example, by selecting new work place button 46, it is contemplated that a screen display is presented to the user showing all available templates from which the new work place can be created. The user selects an appropriate template which includes and/or implements the above described components used to integrate the third party application such that it can be quickly and easily customized by the user and used to create the new work place. For example, the template can be created which provides the appearance of NCS instance 42d as shown in FIG. 5, referencing the portlets, interfaces and migration tools used to integrate a third party application instance. In that manner, a user would be presented with a similar display which can then be customized to the user's satisfaction to provide the desired instance portlets and the like. This can be done through the use of a graphical user interface with the corresponding data being stored in the supporting computing device. Conversely, the user can designate an NCS instance such as that shown in FIG. 5 as a template so that future NCS instances can be implemented based on the template.

Figure 5:
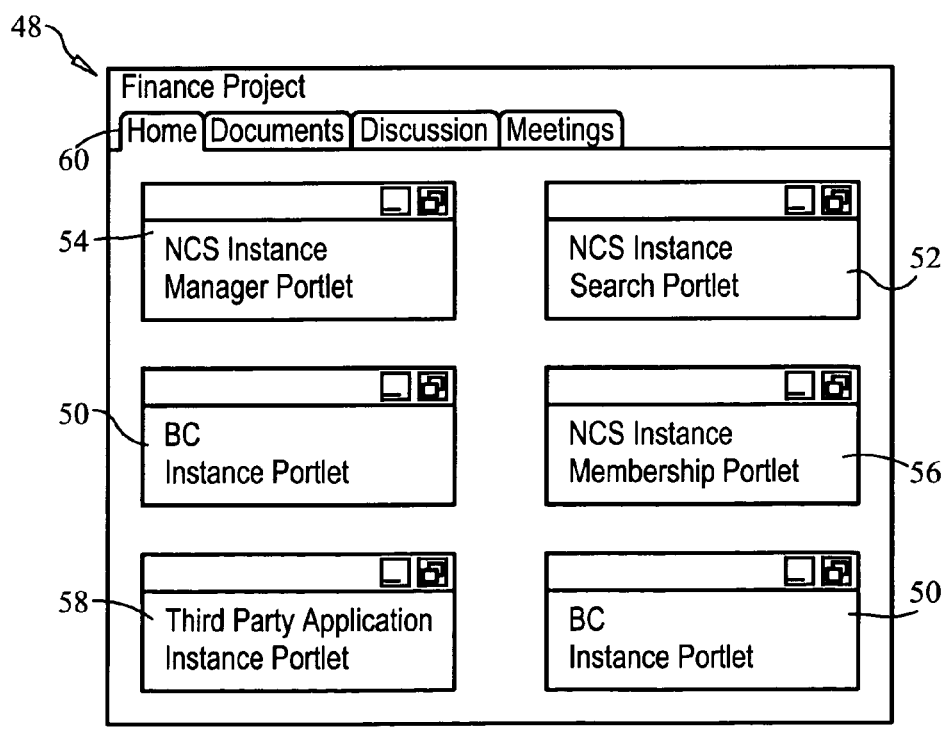
FIG. 5 is an exemplary screen display showing an arrangement of a named collaborative space instance having a portlet with a third party application.

FIG. 5 is an exemplary screen display showing an arrangement of named collaborative space instance 42d. Finance project instance 48 includes a plurality of business component (BC) instance portlets 50, NCS instance search portlet 52, NCS instance manager portlet 54, NCS instance membership portlet 56, third party application instance portlet 58 and screen tabs 60. Business component instance portlets provide specific business component instances such as news, document libraries, discussion forums, stock quotes, etc. The NCS instance search portlet 52 is an application which allows users to search within the NCS instance and its business component instances. The result set is aggregated across the business component that implements the search interface. It is presumed that one of ordinary skill in the art can develop an appropriate search portlet.

NCS instance manager portlet 54 provides the name and metadata information about the NCS instance such as the description and intent of the NCS instance, general information, and the like. NCS instance manager portlet 54 also allows editing of the instance name and metadata, and provides the ability to remove an instance. NCS instance membership portlet 56 provides for the tracking and management of members within the NCS instance. It is contemplated that NCS instance membership portlet 56 can provide a mechanism for inviting new members, and managing existing members. It is presumed that one of ordinary skill in the art can develop and implement a membership portlet.

Third party application instance portlet 58 provides an interface to a third party application instance. As is seen in FIG. 5, third party application instance portlet 58 appears in the same manner as other portlets, thereby advantageously providing a user with a seamless interface to the third party application. The interfaces and migration tool described above with respect to FIG. 3 allow a user to interact with the third party application in a manner which goes far beyond providing a mere window to the third party application. The present invention advantageously allows instances of the third party application and the business component instances provided within a named collaborative space to be manageable by a user within a single user interface.

Screen tabs 60 allow a user to interact with various categories of elements within the NCS instance such as documents, discussion groups, meeting schedulers, online meetings and the like. For example, selecting the documents tab may display a BC instance portlet 50 in the form of a document library.

Access control into an NCS instance, including access control for instances of the third party application as well as the application of permissions such as the ability to create, modify and delete NCS and third party application instances can be provided by the access control logic and processes within the collaborative computing environment such as those which are used to implement and enforce access and permission policy relating to community roles.

The present invention provides a system and method by which collaborative communities can be molded such that, when implemented, result in an addressable and secure named space. NCS 10 aggregates business component instances and maps community roles to business component roles.

Named collaborative spaces, as discussed above, are templatable, provisionable and searchable and provide a mechanism by which NCS instances can be created by user without the need for sophisticated programs, programming tools and highly skilled application developers. NCS 10 provides a framework which can be specialized to provide value to end users and also allows application developers, business component developers and end users to create specialized instances while also implementing and integrating third party applications, thereby allowing use of the features of a J2EE environment within a third party application portlet.

The present invention can be realized in hardware, software, or a combination of hardware and software. For example, the data interfaces between the third party application instance and the collaborative computing environment, templates within the collaborative computing environment that use the third party application instances and the migration tools for creating collaborative computing environment instances which reference existing instances within the third party application can be stored on a storage device included as part of the hardware that implements the present invention. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for integrating an instance of a third party application into a collaborative computing environment instance, the method comprising:
    creating one or more data interfaces between the third party application instance and a collaborative computing environment, the one or more data interfaces including a life cycle application program interface, a sensor application program interface, a transactional application program interface, a search application program interface, and a membership application program interface;
    exposing the third party application instance within the collaborative computing environment by causing the third party application instance to physically appear within the collaborative computing environment via a portlet;
    creating a template within the collaborative computing environment that uses the third party application instance, the template configured to create a space for the portlet within the collaborative computing environment and also configured to point to the one or more data interfaces and also to the portlet; and
    using a migration tool to create collaborative computing environment instances which reference existing instances within the third party application.

2. The method of claim 1, wherein the one or more data interfaces are created as an enterprise java bean.

3. The method of claim 1, wherein the life cycle application program interface is configured for creating, removing, and updating the third party application instance, the sensor application program interface is configured to provide a data reporting instance, the transactional application program interface is configured to inform the collaborative computing environment whether undoing changes is automatic or programmatic, the search application program interface is configured to provide a mechanism to search for a query passed between instances, and the membership application program interface is configured for adding a member to the third party application instance and also for removing the member from the third party application instance.

4. The method of claim 1, wherein the collaborative computing environment instances are named collaborative space instances.

5. The method of claim 4, further comprising creating a coexistant catalog of instances for the named collaborative space instances, at least one the named collaborative space instances referencing the third party application.

6. The method of claim 4, wherein instances of the third party application and instances within a named collaborative space are manageable by a user within a single user interface.

7. The method of claim 6, further including applying access and permission policy for the named collaborative space instance to the third party application instance.

8. A computer-readable storage medium storing a computer program which when executed performs a method for integrating an instance of a third party application into a collaborative computing environment instance, the method comprising:
    creating one or more data interfaces between the third party application instance and a collaborative computing environment, the one or more data interfaces including a life cycle application program interface, a sensor application program interface, a transactional application program interface, a search application program interface, and a membership application program interface;
    exposing the third party application instance within the collaborative computing environment by causing the third party application instance to physically appear within the collaborative computing environment via a portlet;
    creating a template within the collaborative computing environment that uses the third party application instance, the template configured to create a space for the portlet within the collaborative computing environment and also configured to point to the one or more data interfaces and also to the portlet; and
    using a migration tool to create collaborative computing environment instances which reference existing instances within the third party application.

9. The computer-readable storage medium of claim 8, wherein the one or more data interfaces are created as an enterprise java bean.

10. The computer-readable storage medium of claim 8, wherein the life cycle application program interface is configured for creating, removing, and updating the third party application instance, the sensor application program interface is configured to provide a data reporting instance, the transactional application program interface is configured to inform the collaborative computing environment whether undoing changes is automatic or programmatic, the search application program interface is configured to provide a mechanism to search for a query passed between instances, and the membership application program interface is configured for adding a member to the third party application instance and also for removing the member from the third party application instance.

11. The computer-readable storage medium of claim 8, wherein the collaborative computing environment instances are named collaborative space instances.

12. The computer-readable storage medium of claim 11, wherein the method performed by the stored computer program when executed further includes creating a coexistant catalog of instances for the named collaborative space instances, at least one the named collaborative space instances referencing the third party application.

13. The computer-readable storage medium of claim 11, wherein instances of the third party application and instances within a named collaborative space instance are manageable by a user within a single user interface.

14. The computer-readable storage medium of claim 13, the method performed by the stored computer program when executed further includes applying access and permission policy for the named collaborative space instance to the third party application instance.

15. A system for integrating an instance of a third party application into a collaborative computing environment instance, the system comprising
- a first computing device arranged to execute the instance of the third party application; and
- a second computing device in operative data communication with the first computing device,
- the second computing device providing a collaborative computing environment and being arranged to execute the collaborative computing environment instance,
- the second computing device having:
- a storage device, the storage device storing:
  - at least a part of one or more data interfaces between the third party application instance and the collaborative computing environment, the one or more data interfaces including a life cycle application program interface, a sensor application program interface, a transactional application program interface, a search application program interface, and a membership application program interface;
  - a template within the collaborative computing environment that uses the third party application instance, the template configured to create a space for a portlet within the collaborative computing environment and also configured to point to the one or more data interfaces and also to the portlet; and
  - a migration tool for creating collaborative computing environment instances which reference existing instances within the third party application; and
- a central processing unit functioning to:
  - expose the third party application instance within the collaborative computing environment by causing the third party application instance to physically appear within the collaborative computing environment via the portlet; and
  - execute the migration tool to create the collaborative computing environment instance which references the instance within the third party application, the central processing unit being in operative communication with the storage device.

16. The system of claim 15, wherein the one or more data interfaces is an enterprise java bean.

17. The system of claim 15, wherein the life cycle application program interface is configured for creating, removing, and updating the third party application instance, the sensor application program interface is configured to provide a data reporting instance, the transactional application program interface is configured to inform the collaborative computing environment whether undoing changes is automatic or programmatic, the search application program interface is configured to provide a mechanism to search for a query passed between instances, and the membership application program interface is configured for adding a member to the third party application instance and also for removing the member from the third party application instance.

18. The system of claim 15, wherein the collaborative computing environment instances are named collaborative space instances.

19. The system of claim 18, wherein the first computing device and the second computing device are implemented as a single physical device.

20. The system of claim 18, wherein the storage device further stores access and permission policies for the named collaborative space instance, wherein the central processing unit further applies the access and permission policies for the named collaborative space instance to the third party application instance.

* * * * *